(12) United States Patent
Shimizu

(10) Patent No.: US 7,742,647 B2
(45) Date of Patent: Jun. 22, 2010

(54) IMAGE PROCESSING DEVICE AND PROGRAM

(75) Inventor: Hiroshi Shimizu, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 910 days.

(21) Appl. No.: 11/586,047

(22) Filed: Oct. 25, 2006

(65) Prior Publication Data

US 2007/0092145 A1    Apr. 26, 2007

(30) Foreign Application Priority Data

Oct. 26, 2005    (JP)    ............................. 2005-311041

(51) Int. Cl.
G06K 9/36    (2006.01)
G06K 9/40    (2006.01)
G06K 9/32    (2006.01)
G06K 9/46    (2006.01)

(52) U.S. Cl. ................... 382/236; 382/255; 382/300

(58) Field of Classification Search ............. 382/164, 382/167, 173, 190, 232, 233, 236, 254, 255, 382/260, 275, 300; 375/240.06, 240.08, 375/240.17, 240.25, 240.27, E7.106; 348/208.1, 348/208.4, 208.6, 208.99, 222.1, 335, 441, 348/459, 578, 699, 700, E5.046

See application file for complete search history.

(56) References Cited

U.S. PATENT DOCUMENTS

| | | | | |
|---|---|---|---|---|
| 5,410,358 A | * | 4/1995 | Shackleton et al. | ......... 348/459 |
| 5,497,191 A | | 3/1996 | Yoo et al. | |
| 5,701,163 A | * | 12/1997 | Richards et al. | ............. 348/578 |
| 5,844,616 A | * | 12/1998 | Collet et al. | ................ 348/441 |
| 6,148,108 A | * | 11/2000 | Nishikawa | ................... 382/236 |
| 6,809,758 B1 | | 10/2004 | Jones | |
| 7,154,541 B2 | * | 12/2006 | Kondo et al. | ............. 348/222.1 |
| 7,440,634 B2 | * | 10/2008 | Ben-Ezra et al. | ............ 382/255 |
| 7,548,256 B2 | * | 6/2009 | Pilu | ........................ 348/208.3 |

(Continued)

FOREIGN PATENT DOCUMENTS

EP    1 117 251 A1    7/2001

(Continued)

OTHER PUBLICATIONS

Wang, Roy et al, "Fast Camera Motion Analysis in MPEG domain", Image Processing, 1999, ICIP 99. Proceedings. 1999 International Conference on Kobe, Japan Oct. 24-28, 1999 Piscataway, N.J USA, IEEE, U.S., vol. 3, Oct. 24, 1999, pp. 691-694, XP010368796, ISBN: 0-7803-5467-2.

(Continued)

Primary Examiner—Amir Alavi
(74) Attorney, Agent, or Firm—Frishauf, Holtz, Goodman & Chick, P.C.

(57) ABSTRACT

Disclosed is an imaging device provided with a moving image decoding section to decode encoded moving image data encoded by MPEG technique into moving image data, blur total motion vector estimating section to obtain motion vector of macroblock selected by macroblock selecting section that is suitable for estimating a total motion vector as well as to estimate the total motion vector of frame according to the motion vector, and a total motion vector interpolating section to perform blur correction when replaying moving image according to the estimated total motion vector.

21 Claims, 6 Drawing Sheets

U.S. PATENT DOCUMENTS

| | | | | |
|---|---|---|---|---|
| 7,639,741 | B1* | 12/2009 | Holt et al. | 375/240.08 |
| 7,643,553 | B2* | 1/2010 | Monaco | 375/240.06 |
| 2002/0118761 | A1 | 8/2002 | Lee | |
| 2004/0001147 | A1 | 1/2004 | Vella et al. | |
| 2004/0201706 | A1 | 10/2004 | Shimizu et al. | |
| 2004/0213349 | A1* | 10/2004 | Zador et al. | 375/240.22 |
| 2005/0061952 | A1 | 3/2005 | Kawahara | |
| 2005/0259888 | A1* | 11/2005 | Ozluturk | 382/260 |
| 2007/0092145 | A1* | 4/2007 | Shimizu | 382/233 |

FOREIGN PATENT DOCUMENTS

| | | |
|---|---|---|
| EP | 1 377 040 A1 | 1/2004 |
| GB | 2 366 113 A | 2/2002 |
| JP | 10-136304 A | 5/1998 |
| KR | 100292475 B1 | 3/2001 |

OTHER PUBLICATIONS

Korean Office Action dated Mar. 6, 2009 (4 pages), and English translation thereof (3 pages) issued in counterpart Korean Application No. 10-2007-7022807.

* cited by examiner

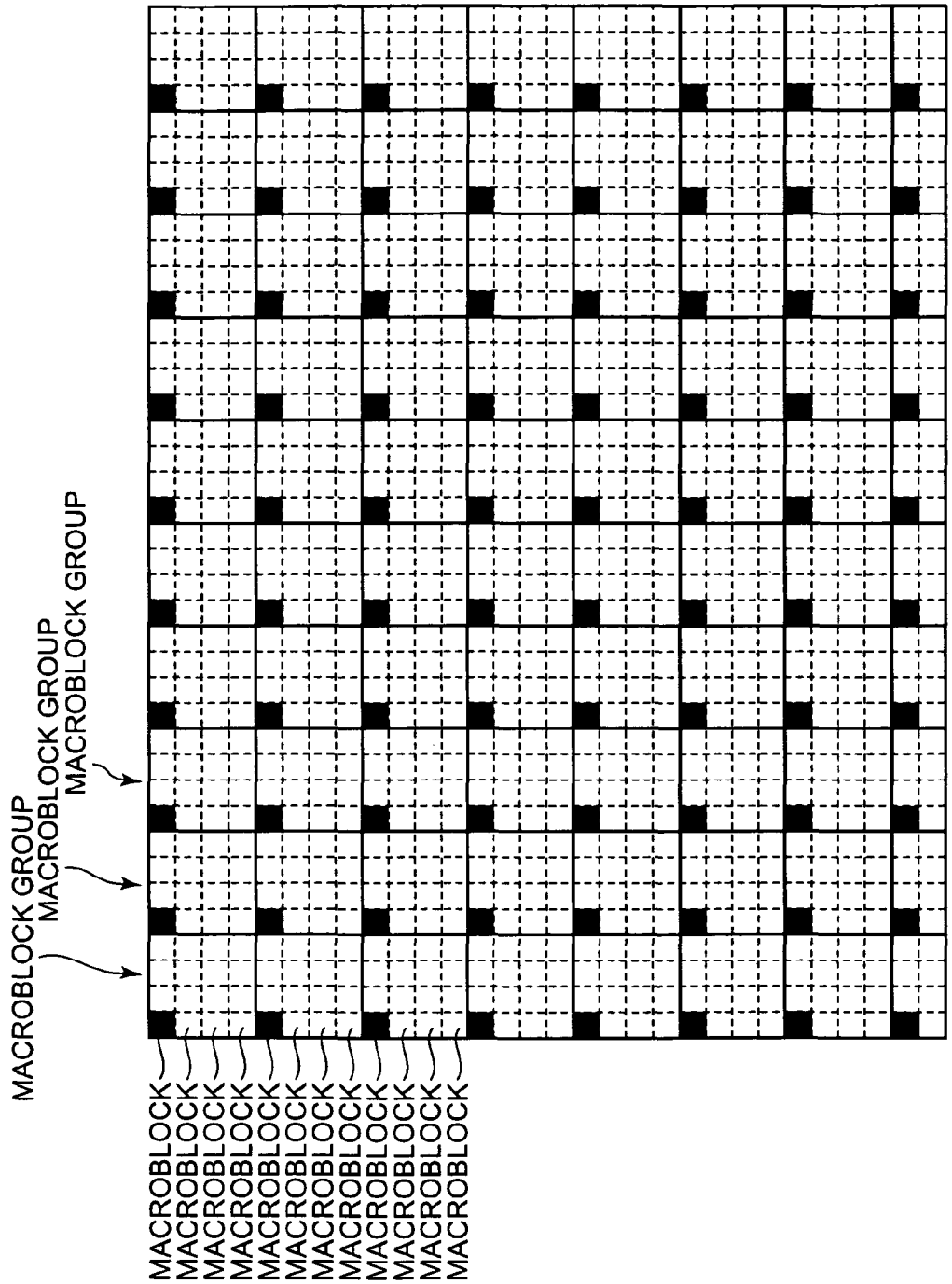

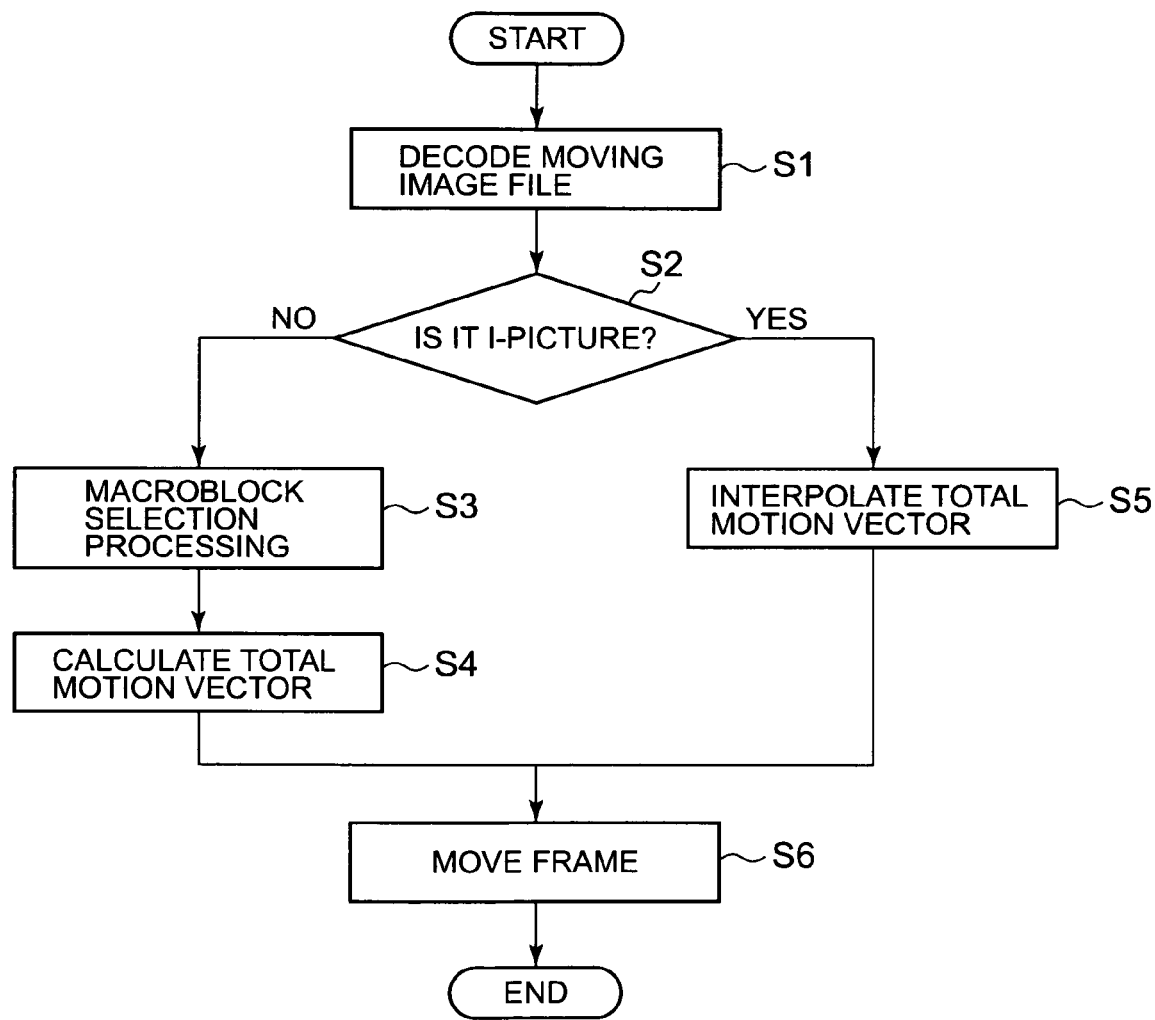

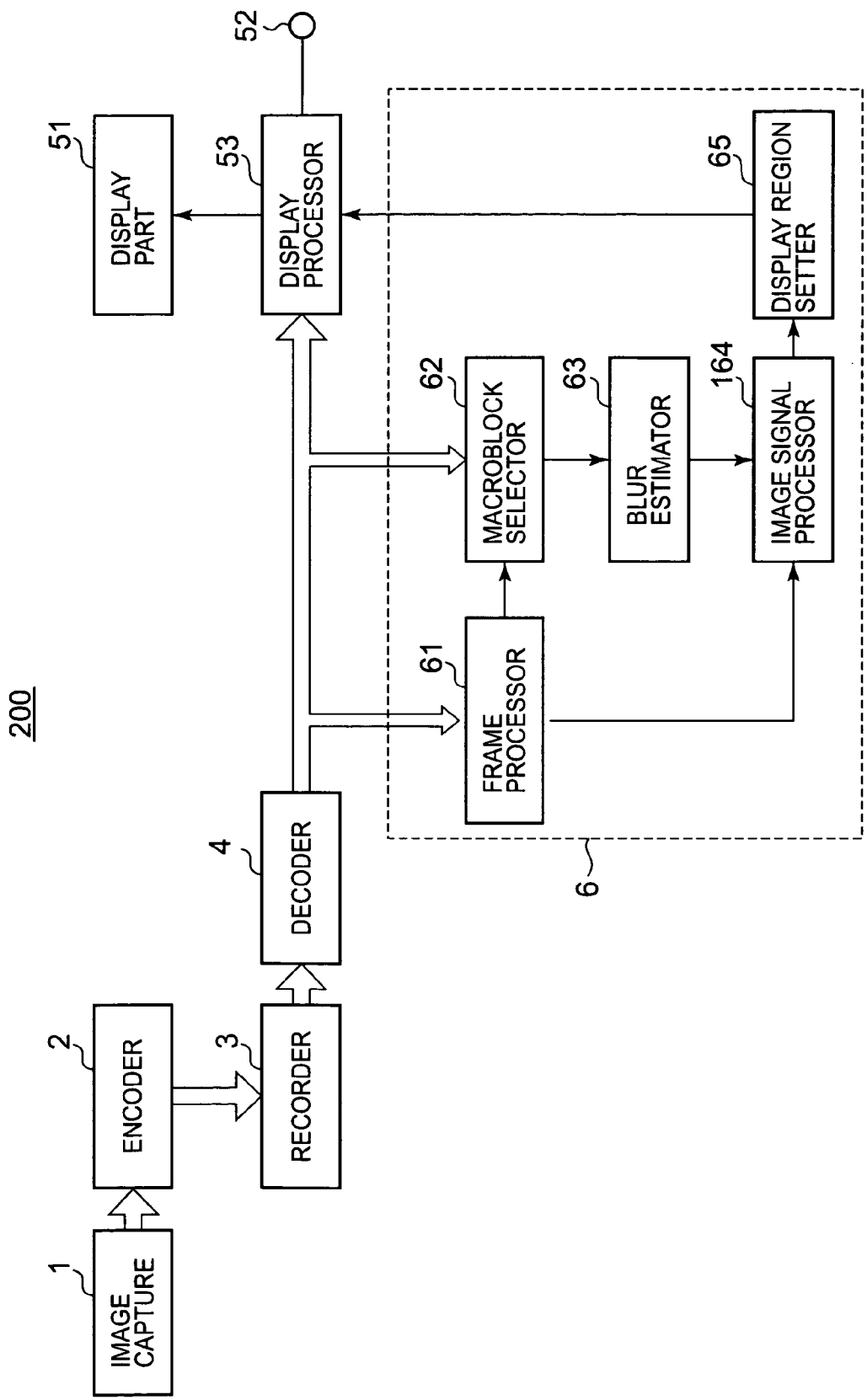

IMAGE PROCESSING DEVICE AND PROGRAM

CROSS-REFERENCE TO RELATED APPLICATIONS

This application is based upon and claims the benefit of priority from the prior Japanese Patent Application No. 2005-311041, filed on Oct. 26, 2005, the entire contents of which are incorporated herein by reference.

BACKGROUND OF THE INVENTION

1. Field of the Invention

The present invention relates to an image processing device and a program to compensate blur of moving image.

2. Related Art

Conventionally, as an imaging device such as a digital camera and the like, one that compensates blur that is generated by imaging moving image, by image processing (what is called blur correction), and then records it as moving image file, has been known.

In addition, concerning a moving image file that has been recorded without performing blur correction when imaging, a device that performs blur correction by detecting movement when replaying the moving image has been developed (For example, refer to Japanese Laid-open Patent Specification Tokukaihei 10-136304, hereinafter referred to as patent document 1).

SUMMARY OF THE INVENTION

Meantime, in the case of the aforementioned patent document 1 and the like, a feature portion of one frame is searched when moving image is replayed, and movement of each portion is detected by comparing the feature portion with frames before and after the frame. Then, movement of entire frame is detected according to the movement of each portion.

However, since a large amount of calculation is required for the searching of feature portion of one frame and the comparing of the feature portion with frames before and after the frame, there is a problem that burden when performing replay is large.

Therefore, an object of the present invention is to provide an image processing device and a program that desirably decrease the burden due to blur correction processing when replaying the moving image recorded without performing blur correction.

According to one aspect of the present invention, an image processing device comprises:

a moving image decoding section to decode encoded moving image information, encoded by an information compression technique that performs motion compensation, into moving image information;

a motion compensation information obtaining section to obtain motion compensation information that relates to at, least one frame among a plurality of frames that structure a moving image, according to decoding of the moving image information by the moving image decoding section;

a total motion vector estimating section to estimate a total motion vector of the frame, according to the motion compensation information obtained by the motion compensation information obtaining section; and a blur correction section to perform blur correction when replaying the moving image, according to the total motion vector estimated by the total motion vector estimating section.

Preferably, the image processing device further comprises:

a frame identification section to identify a frame without motion information, from which the motion compensation information cannot be obtained by the motion compensation information obtaining section, among the plurality of frames; and a total motion vector interpolating section to perform interpolation of the total motion vector that relates to the frame without motion information, according to frames before and after the frame without motion information which is identified by the frame identifying section.

Preferably, the image processing device further comprises:

a frame identification section to identify a frame without motion information, from which the motion compensation information cannot be obtained by the motion compensation information obtaining section, among the plurality of frames;

a feature point extracting section to extract a feature point that relates to the frame without motion information which is identified by the frame identifying section;

a feature point tracking section to track the feature point extracted by the feature point extracting section, in either one of frames before or after the frame without motion information; and a total motion vector determination section to determine a total motion vector that relates to the frame without motion information, according to tracking result of the feature point by the feature point tracking section.

Preferably, the image processing device further comprises:

a credibility checker to determine credibility of a motion vector of a plurality of macroblocks that structure the frame; and a macroblock selecting section to select a macroblock that is determined that credibility of the motion vector is high, among the plurality of macroblocks, as a macroblock to be used for estimation of the total motion vector by the total motion vector estimating section.

Preferably, the credibility checker determines credibility of the motion vector according to a degree of flatness of image portion that relates to the macroblock within the frame.

Preferably, the degree of flatness is determined according to at least one of a Q factor that relates to quantization of image information of the macroblock and an amount of encoding of the macroblock.

Preferably, the credibility checker determines achievement degree of motion compensation of the macroblock, and determines credibility of the motion vector according to achievement degree that is determined.

According to a second aspect of the present invention, an image processing method comprises:

a decoding step to decode encoded moving image information encoded by information compression technique that performs motion compensation, into moving image information;

a motion compensation information obtaining step to obtain information that relates to at least one frame among a plurality of frames that structure moving image, according to decoding of the moving image information;

an estimating step to estimate a total motion vector of the frame according to the obtained motion compensation information; and a blur correction step to correct blur when replaying the moving image according to the estimated total motion vector.

According to a third aspect of the present invention, a software program product embodied in a computer readable medium for performing a method that comprises:

a decoding step to decode encoded moving image information encoded by information compression technique that performs motion compensation, into moving image information;

a motion compensation information obtaining step to obtain information that relates to at least one frame among a plurality of frames that structure moving image, according to decoding of the moving image information;

an estimating step to estimate a total motion vector of the frame according to the obtained motion compensation information; and a blur correction step to correct blur when replaying the moving image according to the estimated total motion vector.

BRIEF DESCRIPTION OF THE DRAWINGS

FIG. 2 is a view schematically showing a frame that structures a moving image displayed on a display of the imaging device shown in FIG. 1;

FIG. 4 is a flowchart showing one example of operation according to the blur correction processing at replay of FIGS. 3A through 3C;

FIG. 6 is a block diagram showing a principal structure of an imaging device according to modification example 1.

DETAILED DESCRIPTION OF THE PREFERRED EMBODIMENTS

Figure 1:
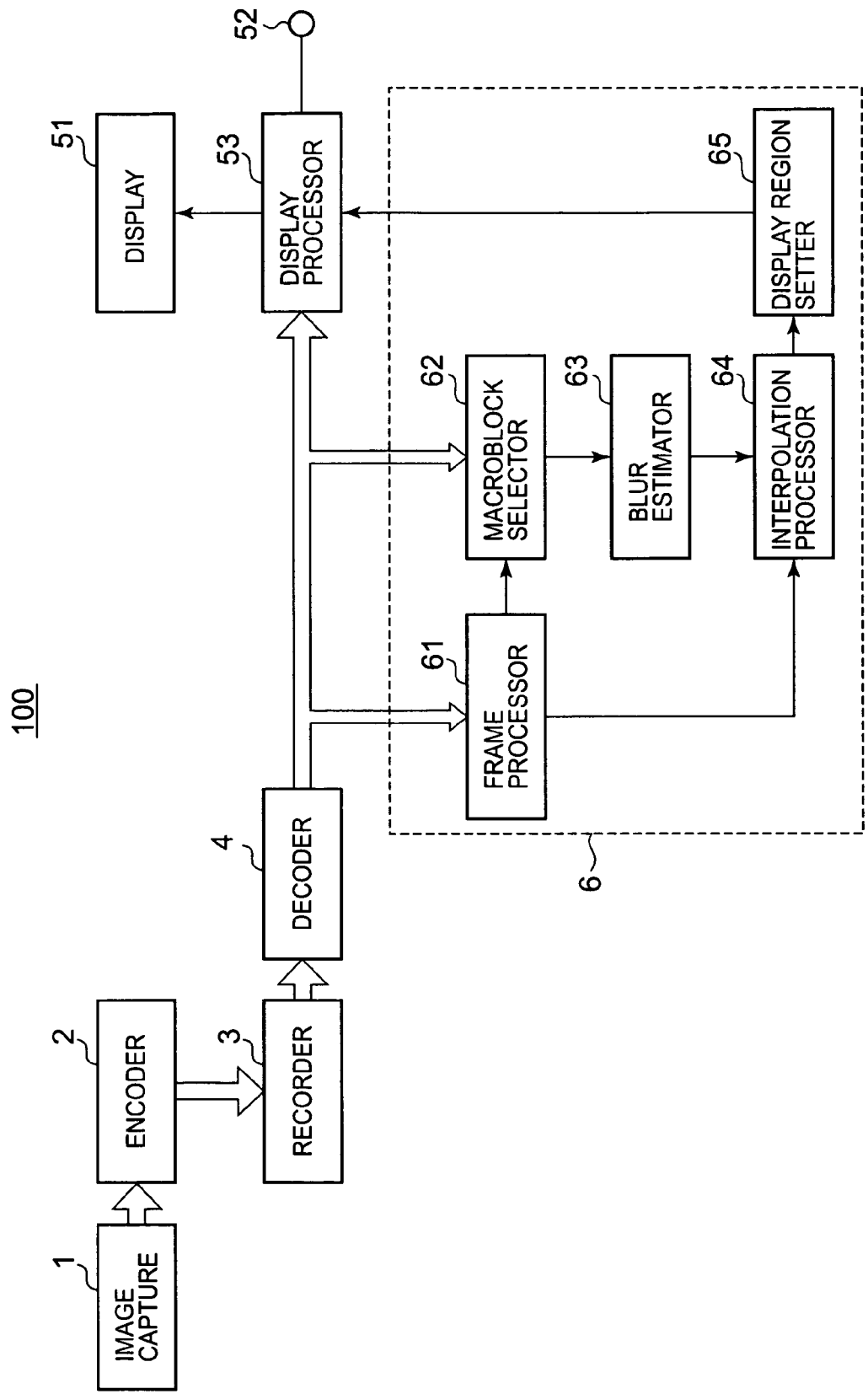
FIG. 1 is a block diagram showing a principal structure of an imaging device that is given as an example of one embodiment of an image processing device applied with the present invention.

Hereinafter, specific embodiments of the present invention will be described with reference to the accompanying drawings. However, scope of the invention is not limited to the examples given in the drawings.

Here, FIG. 1 is a block diagram showing a principal structure of an imaging device 100 that is given as an example of one embodiment of an image processing device applied with the present invention.

The imaging device 100 is, for example, applied with a digital camera and the like, which encodes and records an captured moving image. Here, encoding is performed with information compression technique such as MPEG4 and the like, that are the standard encoding technique to record captured moving image.

In particular, as shown in FIG. 1, the imaging device 100 structured with an image capture 1 to image still image or moving image of an object, an encoder 2 to encode an image captured by the image capture 1 with a predetermined information compression technique, a recoder 3 to record an encoded image data encoded by the encoder 2, a decoder 4 to decode the encoded image data recorded by the recoder 3, a display 51 to display image captured by the image capture 1, a blur correction processor 6 to compensate blur of the moving image displayed at the display 51, and the like.

The image capture 1 is structured so as to be capable to execute imaging of a still image or a moving image within switching, in accordance with a predetermined operation of a switch (not shown) or the like. In particular, the image capture 1 is provided with a group of imaging lenses that has a focusing function, zooming function, or the like; an electronic imaging device that converts image of the object that passed through the group of imaging lenses into two-dimensional image data, comprising CCD, CMOS, or the like; a signal processor to provide a predetermined image processing to image data outputted from the electronic imaging device; and an imaging controller to control the electronic imaging device, the signal processor, or the like.

Under the control of the imaging controller, image data provided with image processing is outputted to the encoder 2, from the signal processor.

The encoder 2 encodes moving image data by information compression technique that performs motion compensation, such as MPEG4 or the like. In particular, information compression encoding processing such as motion compensation that reduces amount of encoding by utilizing correlation in terms of time regarding frame that structure the moving image, Discrete Cosine Transform (DCT) that reduces amount of encoding by utilizing correlation in terms of space regarding each of the frame, or the like, is executed to the moving image data inputted from the image capture 1.

In addition, the encoder 2 performs quantization for example, in which DCT transformation coefficient calculated by the DCT is divided by a predetermined Q factor that takes visual feature in account.

The motion compensation is a inter frame prediction that divides the inputted image data into macroblock unit that is a square region of 16×16 pixel, detects a block in which difference regarding macroblock becomes minimum by searching a predetermined search area in a reference image, and compensates the amount of movement. Here, a vector that indicates the amount of movement of the detected block within the reference image, in which difference becomes minimum, in the horizontal direction and the vertical direction is called motion vector.

The motion compensation generates P-picture which is a frame forward prediction encoded image, B-picture which is a forward and backward prediction encoded image, and the like, with I-picture, which is an intra-frame encoded image, as a standard.

In addition, the DCT separates an image into low frequency component that is easily noticed by human eye and high frequency component that is difficult to discriminate, by two-dimensional frequency transformation. In particular DCT calculation is performed to the difference of the image processed with motion compensation and the inputted image by a block unit of 8×8 pixels.

Here, since the I-picture is an intra-frame encoded image, DCT calculation is performed directly to the inputted image without obtaining difference.

The recoder 3 is structured with a magnetic or an optical recording medium, a semiconductor memory, or the like, and records still image data and moving image data encoded by the encoder 2.

The decoder (moving image decoding section) 4, when replaying moving image, generates bit stream (moving image data) by decoding encoded image data recorded in the recoder 3. In particular, the decoder 4 calculates quantization coefficient and motion vector by decoding the encoded moving image data, and further performs reverse quantization to transform the quantization coefficient into DCT coefficient. Then, reverse DCT is performed to calculate pixel value (difference between pixel values) according to the DCT coefficient, for block unit of 8×8 pixel. Further, P-picture and B-picture are decoded by adding block that has been compensated by difference between pixel values and motion vector.

The display 51 is structured with a liquid crystal display device and the like for example, and displays various kinds of image according to image data decoded by the decoder 4. In addition, a display processor 53 connected with an external output terminal 52 is connected to the display 51.

The external output terminal 52 serves so as to connect a display device (a television for example, not shown) and display image. The display processor 53 cuts out a required portion from image data, decoded by the decoder 4, according to a display region 5R set by a display region setter 65 (described later) of blur correction processor 6 within the replay blur correction processing. Then the required portion is processed into a form that can be displayed in the display 51 or a display device connected to the external output terminal 52.

Here, the display processor 53 is provided with a buffer (not shown) in order to synchronize with delayed time resulting from interpolation operation of total motion vector by an interpolation processor 64.

The blur correction processor (blur correction section) 6 performs blur correction by detecting amount of blur, that is, amount of movement of frame, when moving image data that was recorded without performing blur correction processing is replayed (displayed) in the display 51. In particular, the blur correction processor 6 is provided with a frame processor 61, a macroblock selector 62, a blur estimator 63, an interpolation processor 64, a display region setter 65, and the like.

The frame processor 61 performs processing to apply order, regarding a plurality of frames that structure bit stream (moving image) which is decoded by the decoder 4.

In addition, the frame processor 61 determines whether it is an I-picture (frame without motion information) from which motion vector (motion compensation information) cannot be obtained or not, for each of the plurality of frames. Then, the result of determination is outputted to the macroblock selector 62 and the interpolation processor 64. That is, the frame processor 61 structures a frame identification section to identify I-picture that is provided periodically among the plurality of frames.

The macroblock selector 62 performs selection of macroblock that is suitable for calculating total motion vector of the frame, concerning the frame that was determined that it is not I-picture (for example, P-picture and B-picture) by the frame processor 61.

That is, for example, in a case of MPEG4 stream of VGA size, there are 1200 macroblocks (refer to FIG. 2) per one frame, and comprise Inter macroblock that have inter-frame compensation, and Intra macroblock that do not have inter-frame compensation. Among these, it is assumed that total motion vector (blur) concerning one entire frame is calculated by averaging motion vector of Inter macroblock.

However, there is also a possibility that erroneous motion vector was generated when encoding the frame. Therefore, not all of the motion vectors are suitable for calculating total motion vector. Further, since it is not practical to perform detection again to determine whether the motion vector was an erroneous detection or not, it is determined whether the possibility of erroneous detection is high or not, according to various kinds of information relating to macroblock. Thus, macroblock with higher credibility is selected.

Here, the macroblock selector 62 structures a credibility checker that determines credibility of motion vector of a plurality of macroblocks that structure one frame. Further, the macroblock selector 62 selects a macroblock that is determined to have motion vector with high credibility, among the plurality of macroblocks, as the macroblock that is used to estimate total motion vector of one frame by the blur estimator 63.

Here, concerning the determination of credibility of motion vector by the macroblock selector 62, calculation burden for processing all of the macroblock in one frame is large. Therefore, the frame is divided into macroblock group (a 4 by 4 group of macroblock). Then credibility is determined by selecting one macroblock from each group. In a case where the credibility is high, that macroblock is selected as the macroblock that is used to estimate the total motion vector, and in a case where credibility is low, a similar processing is performed to other macroblock in the macroblock group (for example, the next macroblock).

In addition, the macroblock selector (credibility by degree of flatness determination section) 62 determines credibility of the motion vector of the macroblock of the frame, according to the degree of flatness of an image portion regarding the macroblock.

That is, concerning one frame, in a portion where it is flat and have few features, erroneous detection of motion vector is prone to occur. Thus motion vector of macroblock relating to image portion where it is flat and has few features has low credibility, and is not used to estimate the total motion vector.

In particular, the Q factor (quantization parameter) provided for encoding image data of macroblock by the encoder 2 becomes small in the portion where it is flat and has few features, and becomes large in the portion where frequency component is large. Therefore, the macroblock selector 62 determines degree of flatness of image according to this Q factor.

In addition, the macroblock selector 62 determines achievement degree of motion compensation of macroblock of the frame according to DC coefficient after DCT by the encoder, and then determines credibility of the motion vector of the macroblock according to the determination result.

That is, the DC coefficient is a difference of DC component regarding the reference block after DCT, and in a case where the DC coefficient becomes large, there is a possibility that motion compensation was not done in the correct position, and thus the difference of DC component from the reference block has become large. Therefore, in a case where the DC coefficient is predetermined threshold or larger, the credibility of the motion vector of the macroblock is low, and thus it is not used to estimate the total motion vector.

Here, the macroblock selector 62 structures a motion compensation achievement degree determination section that determines achievement degree of motion compensation of the macroblock. Further, the macroblock selector 62 structures a credibility by achievement degree determination section that determines credibility of the motion vector according the determination result.

The blur estimator 63 obtains motion vector of a plurality of macroblocks that are suitable for estimating the total motion vector of one frame selected by the macroblock selector 62, and calculates blur (total motion vector) of the frame by performing averaging processing to these motion vectors.

Here, the blur estimator 63 structures a motion compensation information obtaining section that obtains motion vector relating to at least one frame among a plurality of frames that structure moving image in accordance with the decoding of moving image data by the decoder 4. Further, the blur estimator 63 structures a total motion vector estimating section that estimates the total motion vector of the frame according to the obtained motion vector.

The interpolation processor 64 calculates the total motion vector of the I-picture from the total motion vector of the frame that is positioned before and after the I-picture (frame without motion information) identified by the frame processor 61, by interpolation processing.

Here, the interpolation processor 64 structures a total motion vector interpolating section that performs interpolation of the total motion vector relating to the I-picture (frame without motion information).

Figure 3A:
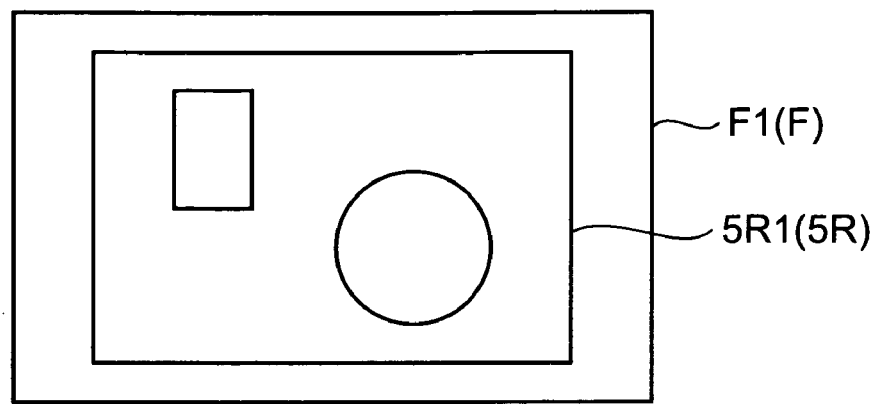
FIGS. 3A through 3C are views schematically showing the frame and display region that relate to blur correction processing at replay, by the imaging device shown in FIG. 1.

The display region setter 65 sets the display region 5R of the frame F of the moving image that is displayed on the display 51 (FIG. 3A). In particular, when replaying moving image structured by these frame s F, according to the total motion vector of the P-picture and B-picture that are calculated (estimated) by the blur estimator 63 and the total motion vector of the I-picture calculated by the interpolation processor 64, the display region setter 65 performs blur correction by moving the display region 5R2 (FIG. 3B) of one frame F2 from the display region 5R1 (FIG. 3A) of previous frame F1, for the amount of the total motion vector. Thus, moving image that is compensated for blur (refer to FIG. 3C) is replay displayed on the display 51.

Figure 3B:
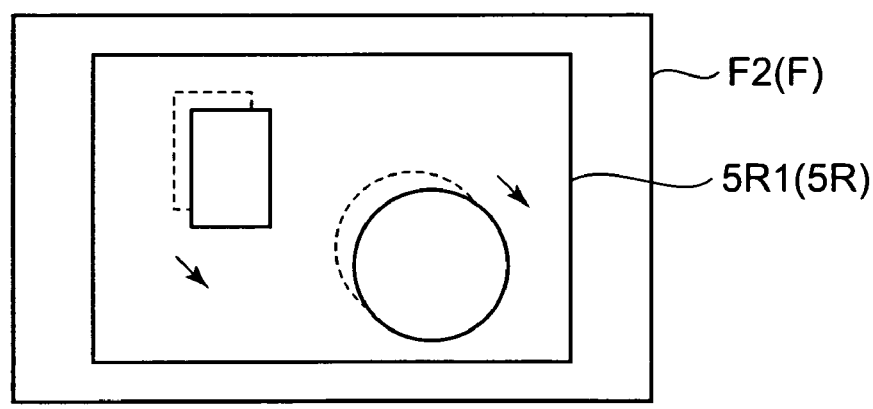
Figure 3C:
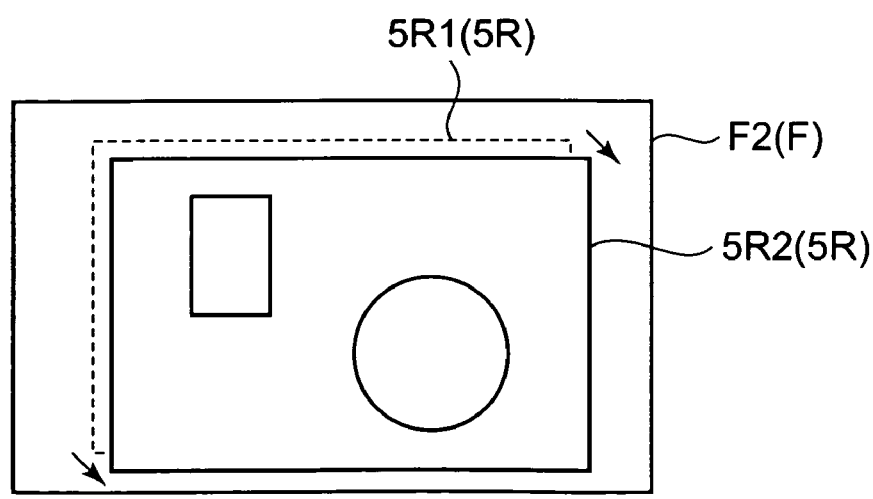

Here, FIG. 3A is a view schematically showing the frame F1 and the display region 5R1 that are displayed first, FIG. 3B is a view schematically showing the frame F2 and the display region 5R2 that are to be displayed after the frame F1 originally, and FIG. 3C is a view schematically showing the frame F2 and the display region 5R2 that are displayed after blur correction processing.

Next, blur correction processing at replay is described with reference to FIGS. 4 and 5.

Figure 5:
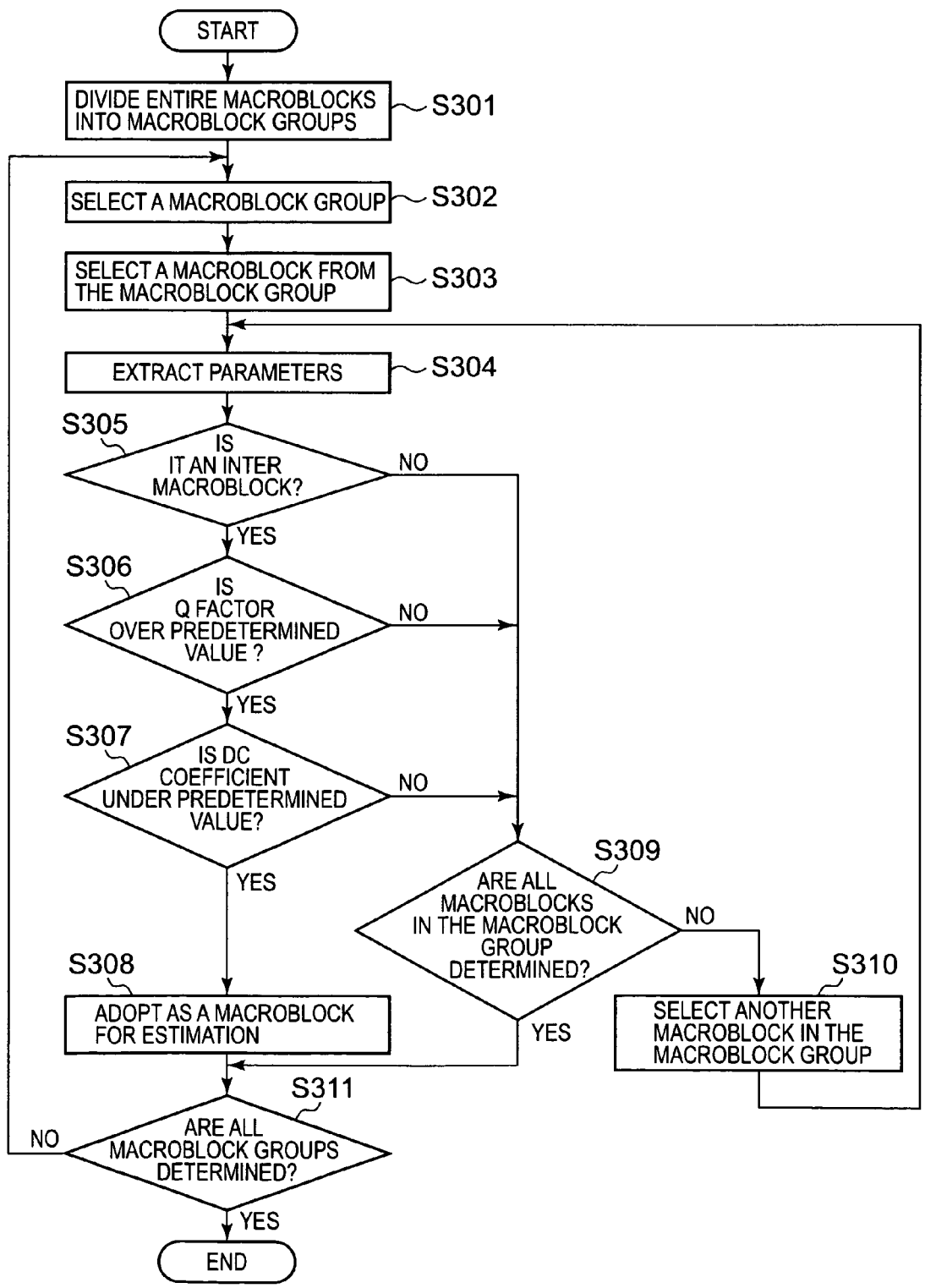
FIG. 5 is a flowchart showing one example of operation according to a macroblock selection processing at the blur correction processing at replay, of FIGS. 3A through 3C.

Here, FIG. 4 is a flowchart showing one example of operation according to the blur correction processing at replay, and FIG. 5 is a flowchart showing one example of operation according to a macroblock selection processing at the blur correction processing at replay.

As shown in FIG. 4, when replay of moving image recorded in the recoder 3 is instructed according to a predetermined operation of imaging device 100 by a user, first of all, the decoder 4 generates bit stream by obtaining MPEG moving image file from the recoder 3 and decoding the file (step S1).

Subsequently, the frame processor 61 performs processing to apply order to a plurality of frames included in the decoded bit stream, as well as determines whether it is I-picture or not for each frame (step S2). Then, I-picture is marked, and determination result by the frame processor 61 is sent to the macroblock selector 62 and the interpolation processor 64.

Then, to a frame that was determined that it is not I-picture (step S2; NO) in step S2, macroblock selector 62 performs macroblock selection processing (step S3).

Hereinafter, macroblock selection processing is described with reference to FIG. 5.

As shown in FIG. 5, the macroblock selector 62 divides macroblocks of the inputted frame into macroblock group (a 4 by 4 group of macroblocks) (refer to FIG. 2, step S301).

Subsequently, the macroblock selector 62 selects one macroblock group among the divided macroblock group (step S302), and selects one macroblock in this macroblock group (for example, black filled macroblock in upper left corner in FIG. 2) (step S303).

Subsequently, the macroblock selector 62 extracts (obtains) Q factor that relates to the macroblock, and various kinds of parameters relating to selection of macroblock such as DC coefficient, from the decoded bit stream (step S304).

Then, the macroblock selector 62 determines whether the selected macroblock is an Inter macroblock or not, according to an Intra/Inter flag (step S305).

Here, in a case where it is determined that it is an Inter macroblock (step S305; YES), the macroblock selector 62 determines whether the Q factor of the macroblock is predetermined value or more (step S306).

In a case where it is determined that the Q factor is over predetermined value, that is, in a case where it is determined that it is a macroblock with large amount of frequency component (step S306; YES), the macroblock selector 62 determines whether DC coefficient of the macroblock after DCT is under predetermined value (step S307).

Here, in a case where it is determined that the DC coefficient is under predetermined value (step S307; YES), the macroblock selector 62 adopts the macroblock as the macroblock to estimate the total motion vector (step S308).

Meantime, in a case where it is determined that it is not Inter macroblock, that is, it is determined that it is Intra macroblock of independent type that have no motion vector (step S305; NO) in step S305, in a case where it is determined that the Q factor is not predetermined value or more (step S306; NO) in step S306, or in a case where the DC coefficient is not predetermined value or less, that is, it is determined that the possibility that motion compensation is not done in the correct position is large (step S307; NO) in step S307, the macroblock selector 62 determines whether or not determination of various kinds of parameters are performed for all of the macroblock in the macroblock group in which the macroblock is included (step S309).

Here, in a case where it is determined that determination is not performed for all of the macroblock (step S309; NO), the macroblock selector 62 selects another macroblock in the macroblock group (step S310), and moves on to step S304, and executes the following processing.

In addition, in a case where it is determined that it is determined for all of the macroblock in step S309, or in a case where it is adopted as the macroblock for estimation in step S308, it is determined whether estimation of macroblock relating to estimation of the total motion vector is performed for all the macroblock group (step S311).

Here, in a case where it is determined that estimation of macroblock is not performed for all the macroblock group (step S311; NO), the macroblock selector 62 moves on to step S302 and executes the following processing.

Further, in step S311, in a case where it is determined that estimation of macroblock is performed for all the macroblock groups (step S311; YES), the macroblock selection processing is completed.

When the macroblock selection processing is completed, as shown in FIG. 4, blur estimator 63 obtains motion vector of the plurality of macroblocks relating to one frame adopted by the macroblock selector 62, and calculates the total motion vector of the frame by performing averaging processing of these motion vectors (step S4).

Next, concerning frame (I-picture) that was determined to be I-picture in step S2 (step S2; YES), the interpolation processor 64 obtains the total motion vector of frame, which is one after the I-picture, from the blur estimator 63, and performs interpolation calculation between the total motion vector of the frame and the total motion vector of the frame, which is one before the I-picture. Thus the total motion vector of the I-picture is obtained (step S5).

Subsequently, concerning the plurality of frames F of which the total motion vector are obtained, the display region setter 65 performs blur correction of moving image displayed on the display 51 by moving the display region 5R of one frame from the display region 5R of frame F one before, for the amount of the total motion vector (step S6; refer to FIGS. 3A through 3C).

As described above, according to the imaging device 100 of the present embodiment, since the moving image data is encoded by MPEG technique, the total motion vector of the frame can be estimated according to the motion vector of the plurality of macroblocks of the frame that structure the moving image.

In particular, among the plurality of macroblocks that structure the frame, the macroblock that has motion vector of high credibility can be selected as the macroblock for estimating the total motion vector. Therefore, macroblock with low credibility, which was generated with erroneous motion vector during encoding, is eliminated from estimation of the total motion vector. Thus, estimation of the total motion vector can be performed more appropriately.

Here, determination of credibility of the motion vector of the macroblock in the frame can be performed according to the degree of flatness of the image portion relating to the macroblock, and according to the determination result of achievement degree of motion compensation of the macroblock. Therefore, determination of credibility of the motion vector can be performed further appropriately, thus determination of macroblock that is to be eliminated from estimation of the total motion vector can be performed suitably.

Further, since determination of the degree of flatness of the image portion relating to the macroblock regarding the frame can be performed according to the Q factor relating to quantization of image data of macroblock, determination of the degree of flatness can be performed further appropriately, thus determination of credibility of the motion vector of the macroblock can be performed suitably.

Therefore, even though it is a moving image that was recorded without performing blur correction, blur correction can be performed appropriately according to the estimated total motion vector of the frame, when the moving image is replayed. Thus, when blur correction processing is performed, it is not required to search feature portion within one frame, and to compare the feature portion with frames before and after the frame, as in the conventional practice. As a result, burden due to blur correction processing when replaying the moving image cane be suppressed suitably.

In addition, concerning the I-picture that do not have motion vector, interpolation of the total motion vector relating to the I-picture can be performed appropriately according to the frames before and after the frame. Therefore, even when it is I-picture, its total motion vector can be obtained, thus blur correction processing when replaying the moving image can be performed appropriately.

Here, the present invention is not limited to the afore-mentioned embodiment, and can be applied with various kinds of modification and alteration of design, as long as it does not deviate the scope of the present invention.

For example, as a parameter to determine the degree of flatness of the image portion relating to the macroblock by the macroblock selector 62, the Q factor of the macroblock was used. However, it is not limited to this case. For example, among the frame, since compression efficiency is high in an image portion where it is flat and has few features, amount of encoding becomes less. Therefore, the macroblock selector 62, as an amount of encoding degree of flatness determination section, may use the amount of encoding of the macroblock as the parameter for determination, and determine the degree of flatness of the image portion.

Therefore, according to the amount of encoding of the macroblock, determination of the degree of flatness of the image portion relating to the macroblock can be performed further appropriately. Thus, determination of credibility of the motion vector of the macroblock can be performed suitably.

Further, in the afore-mentioned embodiment, the macroblock used for estimation of the total motion vector was determined according to the Q factor of the macroblock and the DC coefficient after DCT. However, it is not limited to this case. For example, only at least one of the Q factor and the DC coefficient may be used to perform determination, or amount of encoding of the macroblock may be used in addition to either one of them as the parameter to determine, and determination may be performed.

In addition, in the afore-mentioned embodiment, the total motion vector relating to the I-picture that do not have motion vector was interpolated according the total motion vector of the frames before and after. However, method to obtain the total motion vector of the I-picture is not limited to this case. That is, an image signal processor 164 may be provided to the imaging device 200 for example (refer to FIG. 6). Here, the image signal processor 164 extracts the predetermined feature point from the I-picture as a feature point extracting section. Subsequently, as a feature point tracking section, the image signal processor 164 tracks feature point that corresponds to the extracted feature point, in either one of frame, that is before or after the I-picture (for example, frame of one before), by KLT (Kanade-Lucas-Tomasi) feature tracking algorithm or the like. Then, as a total motion vector determination section, the image signal processor 164 determines the total motion vector of the I-picture according to the tracking result of the feature point (movement amount of the feature point).

Therefore, even when it is I-picture that do not have motion vector, its feature point is tracked within either one of frames before or after, and according to the tracking result, the total motion vector relating to the I-picture can be determined. Thus, blur correction processing during moving image replay can be performed appropriately.

In addition, in the afore-mentioned embodiment, as the image processing device relating to the present invention, imaging devices 100 and 200 that take image and display (replay) captured still image and moving image were given as an example. However, it is not limited to this case, and it may be any device as long as it can perform at least replay of moving image. For example, moving image file may be loaded to personal computer (PC; not shown) or the like as image processing device, and execution of decoding processing of the moving image file, obtaining processing of the motion vector, calculation processing of the total motion vector, and blur correction processing at replay of the moving image may be performed according to execution of a predetermined program by the PC, to realize the present invention.

What is claimed is:

1. An image processing device comprising:
   a moving image decoding section to decode encoded moving image information, encoded by an information compression technique that performs motion compensation, into moving image information;
   a motion compensation information obtaining section to obtain motion compensation information that relates to at least one frame among a plurality of frames that structure a moving image, according to decoding of the moving image information by the moving image decoding section;
   a total motion vector estimating section to estimate a total motion vector of the frame, according to the motion compensation information obtained by the motion compensation information obtaining section; and
   a blur correction section to perform blur correction when replaying the moving image, according to the total motion vector estimated by the total motion vector estimating section.

2. The image processing device as claimed in claim 1, further comprising:
- a frame identification section to identify a frame without motion information, from which the motion compensation information cannot be obtained by the motion compensation information obtaining section, among the plurality of frames; and
- a total motion vector interpolating section to perform interpolation of the total motion vector that relates to the frame without motion information, according to frames before and after the frame without motion information which is identified by the frame identifying section.

3. The image processing device as claimed in claim 1, further comprising:
- a frame identification section to identify a frame without motion information, from which the motion compensation information cannot be obtained by the motion compensation information obtaining section, among the plurality of frames;
- a feature point extracting section to extract a feature point that relates to the frame without motion information which is identified by the frame identifying section;
- a feature point tracking section to track the feature point extracted by the feature point extracting section, in either one of frames before or after the frame without motion information; and
- a total motion vector determination section to determine a total motion vector that relates to the frame without motion information, according to tracking result of the feature point by the feature point tracking section.

4. The image processing device as claimed in claim 1, further comprising:
- a credibility checker to determine credibility of a motion vector of a plurality of macroblocks that structure the frame; and
- a macroblock selecting section to select a macroblock that is determined that credibility of the motion vector is high, among the plurality of macroblocks, as a macroblock to be used for estimation of the total motion vector by the total motion vector estimating section.

5. The image processing device as claimed in claim 4, wherein the credibility checker determines credibility of the motion vector according to a degree of flatness of image portion that relates to the macroblock in the frame.

6. The image processing device as claimed in claim 5, wherein the degree of flatness is determined according to at least one of a Q factor that relates to quantization of image information of the macroblock and an amount of encoding of the macroblock.

7. The image processing device as claimed in claim 4, wherein the credibility checker determines achievement degree of motion compensation of the macroblock, and determines credibility of the motion vector according to achievement degree that is determined.

8. An image processing method comprising:
- a decoding step to decode encoded moving image information encoded by information compression technique that performs motion compensation, into moving image information;
- a motion compensation information obtaining step to obtain information that relates to at least one frame among a plurality of frames that structure moving image, according to decoding of the moving image information;
- an estimating step to estimate a total motion vector of the frame according to the obtained motion compensation information; and
- a blur correction step to correct blur when replaying the moving image according to the estimated total motion vector.

9. The image processing method as claimed in claim 8, further comprising:
- a frame identification step to identify a frame without motion information among the plurality of frames; and
- a total motion vector interpolating step to perform interpolation of the total motion vector that relates to the frame without motion information, according to frames before and after the frame without motion information which is identified.

10. The image processing method as claimed in claim 8, further comprising:
- a frame identification step to identify a frame without motion information among the plurality of frames;
- a feature point extracting step to extract a feature point that relates to the frame without motion information which is identified;
- a feature point tracking step to track the feature point extracted, in either one of frames before or after the frame without motion information; and
- a total motion vector determination step to determine a total motion vector that relates to the frame without motion information, according to tracking result of the feature point.

11. The image processing method as claimed in claim 8, further comprising:
- a credibility checking step to determine credibility of a motion vector of a plurality of macroblocks that structure the frame; and
- a macroblock selecting step to select a macroblock that is determined that credibility of the motion vector is high, among the plurality of macroblocks, as a macroblock to be used for estimation of the total motion vector.

12. The image processing method as claimed in claim 11, wherein the credibility of the motion vector is determined according to a degree of flatness of image portion that relates to the macroblock within the frame, in the credibility checking step.

13. The image processing method as claimed in claim 12, wherein the degree of flatness is determined according to at least one of a Q factor that relates to quantization of image information of the macroblock and an amount of encoding of the macroblock.

14. The image processing method as claimed in claim 11, wherein the credibility of the motion vector is determined according to achievement degree of motion compensation of the macroblock, in the credibility checking step.

15. A computer readable medium having a computer program stored thereon that is executable by a computer to cause the computer to execute a method comprising:
- a decoding step to decode encoded moving image information encoded by information compression technique that performs motion compensation, into moving image information;
- a motion compensation information obtaining step to obtain information that relates to at least one frame among a plurality of frames that structure moving image, according to decoding of the moving image information;
- an estimating step to estimate a total motion vector of the frame according to the obtained motion compensation information; and
- a blur correction step to correct blur when replaying the moving image according to the estimated total motion vector.

16. The computer readable medium claim 15, wherein the method performed by the computer further comprises:
- a frame identification step to identify a frame without motion information among the plurality of frames; and
- a total motion vector interpolating step to perform interpolation of the total motion vector that relates to the frame without motion information, according to frames before and after the frame without motion information which is identified.

17. The computer readable medium claim 15, wherein the method performed by the computer further comprises:
- a frame identification step to identify a frame without motion information among the plurality of frames;
- a feature point extracting step to extract a feature point that relates to the frame without motion information which is identified;
- a feature point tracking step to track the feature point extracted, in either one of frames before or after the frame without motion information; and
- a total motion vector determination step to determine a total motion vector that relates to the frame without motion information, according to tracking result of the feature point.

18. The computer readable medium claim 15, wherein the method performed by the computer further comprises:
- a credibility checking step to determine credibility of a motion vector of a plurality of macroblocks that structure the frame; and
- a macroblock selecting step to select a macroblock that is determined that credibility of the motion vector is high, among the plurality of macroblocks, as a macroblock to be used for estimation of the total motion vector.

19. The computer readable medium claim 18, wherein the credibility of the motion vector is determined according to a degree of flatness of image portion that relates to the macroblock within the frame, in the credibility checking step.

20. The computer readable medium claim 19, wherein the degree of flatness is determined according to at least one of a Q factor that relates to quantization of image information of the macroblock and an amount of encoding of the macroblock.

21. The computer readable medium claim 18, wherein the credibility of the motion vector is determined according to achievement degree of motion compensation of the macroblock, in the credibility checking step.

\* \* \* \* \*